Oct. 12, 1943.    W. S. REYNOLDS    2,331,422
AMMUNITION GAUGING MACHINE
Filed Feb. 24, 1941    3 Sheets-Sheet 1

INVENTOR
WARREN S. REYNOLDS
BY
ATTORNEY

INVENTOR
WARREN S. REYNOLDS
BY
ATTORNEY

Patented Oct. 12, 1943

2,331,422

UNITED STATES PATENT OFFICE 2,331,422

AMMUNITION GAUGING MACHINE

Warren S. Reynolds, Stratford, Conn., assignor to Remington Arms Company, Inc., a corporation of Delaware Application February 24, 1941, Serial No. 380,101

4 Claims. (Cl. 209—82)

This invention relates to improvements in gauging and assorting apparatus. In particular it relates to apparatus for gauging and assorting cartridges and shells.

Although the machine in which the present invention is embodied is especially intended and adapted for gauging and assorting cartridge shells and loaded or completed cartridges, the dimensions of which must conform to certain exacting standards in order to fit the breech chambers of guns in which they are to be used, it will be readily appreciated that the machine may be advantageously used for gauging and assorting other products.

Primary objects of the present invention are to provide a gauging machine which: will work positively and accurately to very close tolerances; can work in a high-speed yet smooth and safe manner upon dangerous products such as cartridges; eliminates or greatly reduces jamming, and in which there will be an ineffective working of the machine without dangerously crushing the product if by any chance there should be a jamming; although capable of operating upon a large quantity of dangerous product such as cartridges, is small, simple and inexpensive to manufacture.

Features of the invention include the provision of gauging and assorting machine with: a single simple reciprocating gauge adapted to check or gauge overlength, standard and underlength product one at a time and carry such product from a work support to an unloading station; the gauging mechanism just described plus simple impelling mechanism adapted to gently wedge product in the gauge; gauging and impelling mechanism as just described plus simple automatic ejecting means adapted to eject overlength, standard and underlength product from the gauge into predetermined chutes; three simple bell cranks carrying gauging, impelling and ejecting members and all operated by a single drive shaft.

Other objects, features and advantages will be described or apparent hereinafter.

General description

Broadly, to provide a broad general comprehension of the present invention which will facilitate an understanding of the detailed description hereinafter, the machine, embodying the present preferred form of the invention and shown in the accompanying drawings, includes a work holder capable of directing pieces of product one by one into the path of an arcuately movable gauge having tapered jaws. A simple impelling or pushing mechanism is preferably included to yieldingly wedge such product into overlength, standard and underlength sections of the gauge. After product is so wedged into the gauge it is arcuately moved by the latter into a predetermined position over a set of chutes at which point an automatic ejector presses down upon the product to cause the same to drop from the gauge into underlying chutes proportioned and located to receive the three different grades of product.

In the drawings, which show the present preferred embodiments of the invention:

Figures 1, 5:
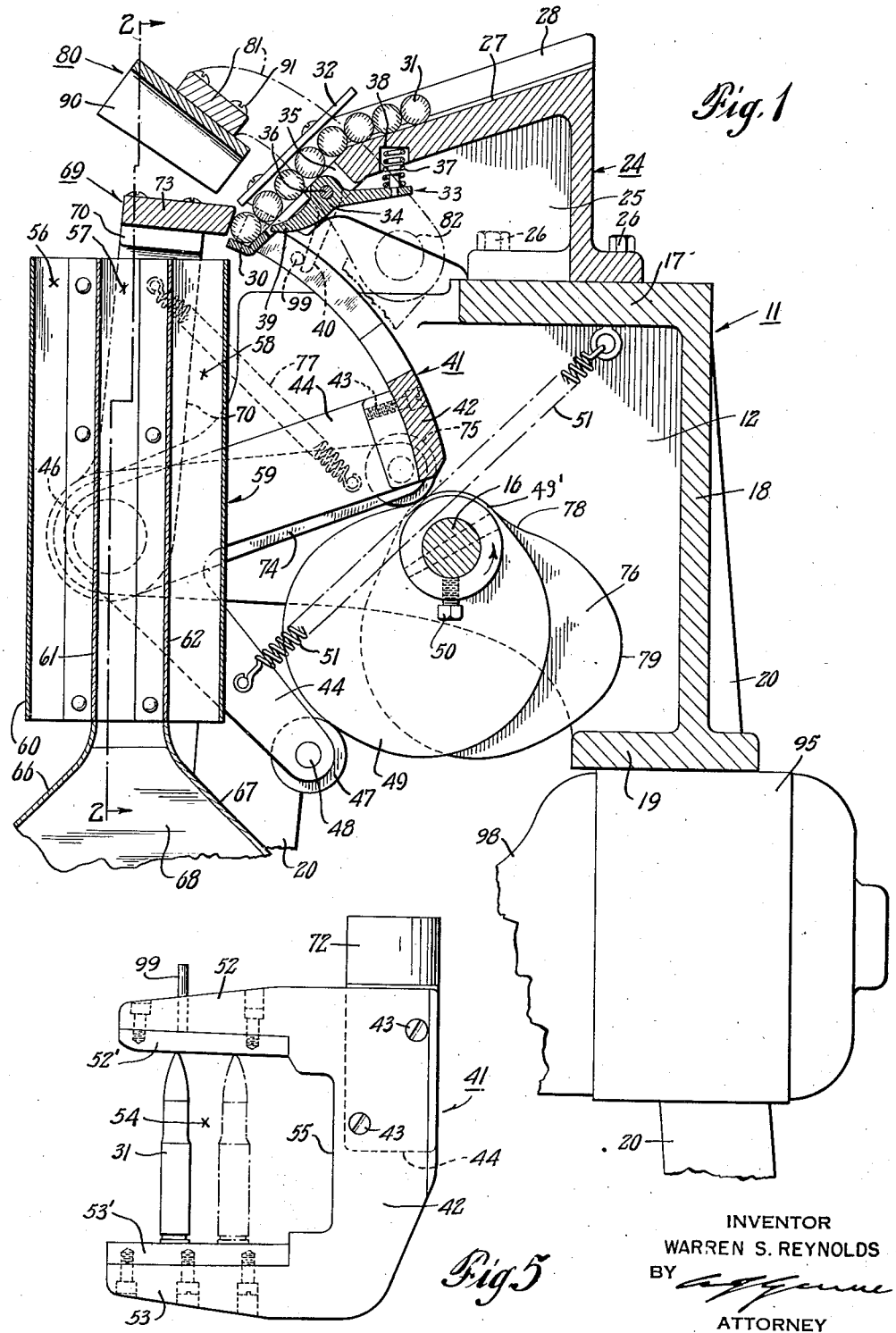
Figure 1 is a sectional side view of a machine embodying the present invention, taken on line 1—1 of Fig. 2.
Fig. 5 is a detail view of the gauging member.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Main frame

Referring now in detail to the drawings which show the present preferred embodiments of the invention there is provided a main frame 11 which may be of any desired configuration and made of any desired material, a casting being shown in the present drawings.

This main frame 11, in the present showing, includes side walls 12 and 13 with suitable bores in bosses 14 and 15, respectively, arranged to rotatably support a main drive shaft 16. Interconnecting and supporting these side walls 12 and 13 are top, rear and bottom walls 17, 18 and 19, respectively. A plurality of legs 20 are secured to ledges 21 and 22, respectively, as by screws 23. These legs may be short to support the machine on a bench, table or the like; or, may be long to support the machine on the floor, as will be readily appreciated. If preferred the legs 20 may be made integral with the main frame 11. However, in order to advantageously and economically provide a simple, inexpensive main frame casting, and to simplify the machining and assembly work on the main frame, the legs 20 are preferably not made integral with the main frame but are assembled thereto as shown.

Work holder

A novel work holder 24 (see Figs. 1, 2 and 4) is provided by the present invention in the form of a standard 25 secured to the top wall 17 of the main frame 11 as by screws 26. This standard 25 at the top thereof is provided with an inclined channel 27, defined by side walls 28 and 29 extending downwardly toward the front of the machine. A stop 30 is provided at the lowermost section of the channel 27 in order to limit the downward movement of pieces of product 31 such as shells, cartridges and the like. Illustrative of one working embodiment of the invention, cartridges are shown as the product being tested. However, it will be readily appreciated that a wide variety of products may be tested with the present invention. Preferably, the channel 27 is also provided with an overlying plate 32 to prevent such product from bulging outwardly of the channel, particularly in the forward or steeper part thereof. The rear half of the standard 25 and channel 27 is less steep and is not provided with an overlying plate in order to facilitate loading of the work holder 24. Pieces of product may be dropped into the work holder one at a time, as the machine functions one by one on pieces of product; or, the work holder may be loaded with a plurality of product and serve as a continuous supply or work magazine.

Figure 4:
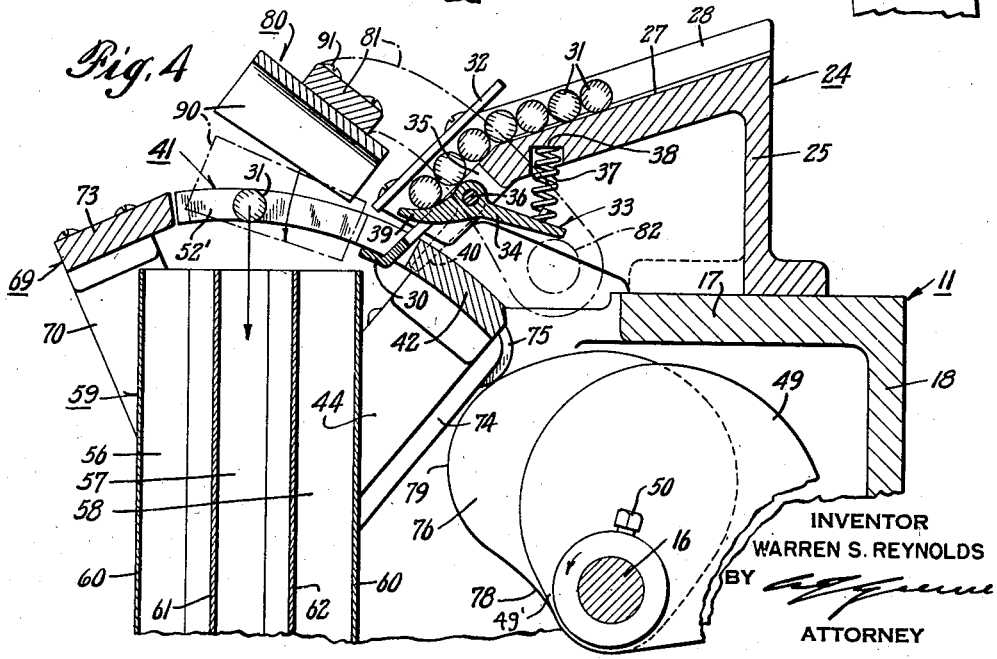
Fig. 4 is a view similar to Fig. 3 but shows the gauging member in advanced and the presser member in retracted positions.

In order to insure a one-by-one passage of product 31 to the stop 30, and to what may be termed the loading station of the work holder, the present invention provides a detent 33 in the form of a simple spring lever 34 in a channel 35 suitably secured to a pivotally mounted rod 36 near the lower end of the standard 25. A spring 37, at its lower end, is suitably mounted upon a suitable pin on the rearwardly extending section of the lever 34, and at its upper end is set in a suitable socket 38 at the underside of the standard 25, as may be seen best in Figs. 1 and 4. Normally the spring 37 urges the rearwardly extending section downwardly, as shown in Fig. 4, in order to lift or move the forwardly extending finger 39 of the lever 34 in a clockwise direction upwardly into the channel 27 in order to prevent product 31 from moving downwardly onto the stop 30. However, as this detent lever 34 is moved in a counterclockwise direction into the position shown in Fig. 1, as by pressing upon a finger 40 suitably secured to the rod 36 upon which the lever 34 is secured (see Fig. 2) either manually, or in an automatic manner more fully described hereinafter, the forwardly extending finger 39 is moved out of the channel 27 and allows the lowermost piece then in the channel to drop onto the stop 30, as shown in Fig. 1. Thereafter, as the finger 40 is released the spring 37 again causes the finger 39 of the lever 34 to engage and restrain the next successive pieces of product then in the channel 27.

Gauging mechanism

Figure 2:
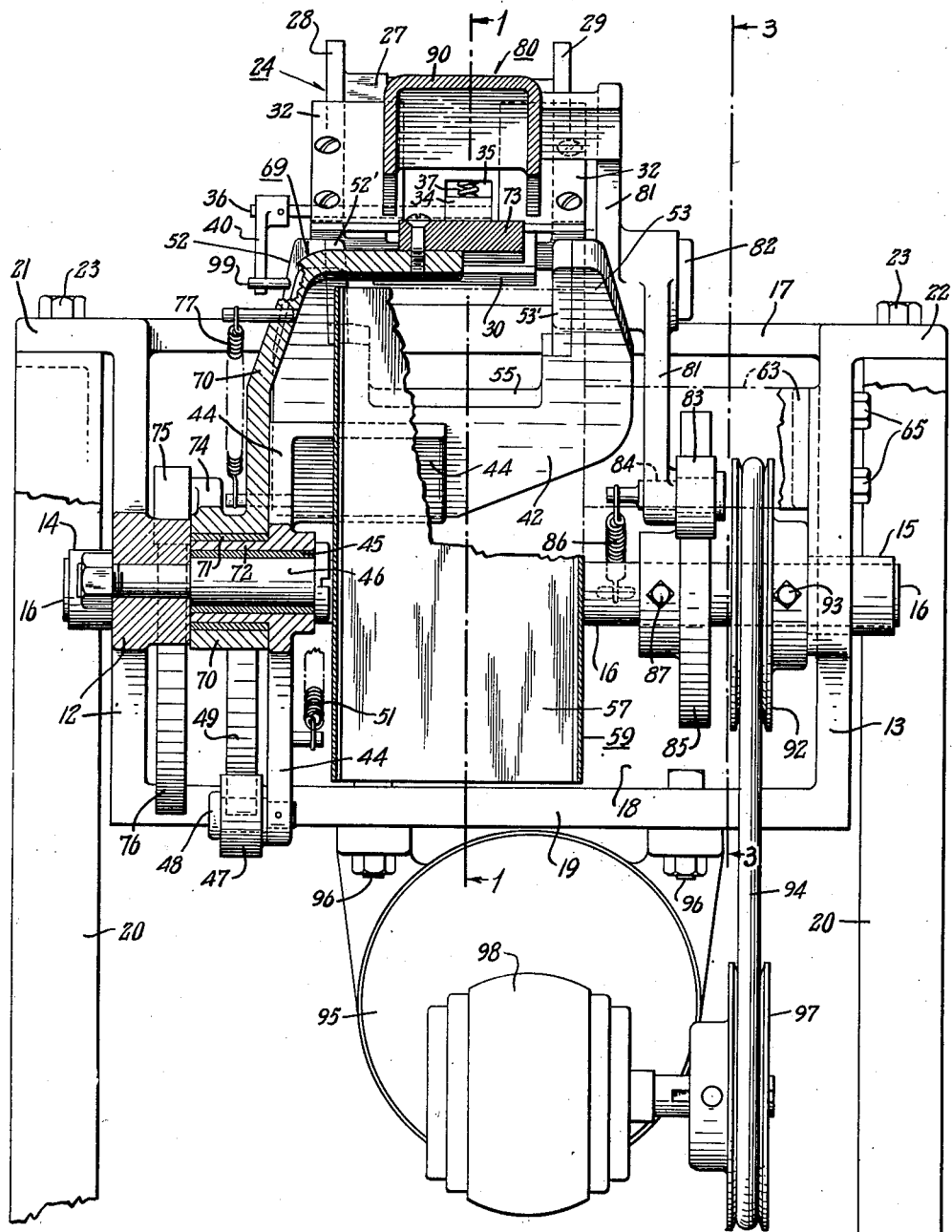
Fig. 2 is a sectional front view, taken on line 2—2 of Fig. 1.

A simple yet very effective gauging mechanism 41 is provided by the present invention, which in its present preferred form includes a gauge 42 (see Figs. 1, 2 and 5 particularly) secured by screws 43 to a bell crank 44 pivotally mounted upon a sleeve 45 carried on a shoulder stud 46 mounted upon the side wall 12, as may be seen best in Fig. 2. This bell crank is preferably provided with a roller 47 on a stud 48 at the lower end thereof which is engageable with a cam 49 secured to the main drive shaft 16 as by a set screw 50 (see Figs. 1 and 2). A suitable spring 51 is secured to the bell crank 44 and main frame 11 to maintain the bell crank 44 against the cam 49 at all times.

Although the gauge 42 may be made integral with the bell crank 44 it is preferably made as a separate member in order to be interchangeably secured thereto as by the screws 43. Thus, larger or smaller gauges may be readily interchanged thereon to condition the machine for gauging larger or smaller cartridges, or other product. The gauge 42 includes jaws 52 and 53 defining a gauging channel 54 therebetween, adapted to receive the product 31 which is to be gauged and assorted. These jaws are tapered relative to each other in order to be closer at the rear or inside of the gauge. This may be accomplished by having one or both of the jaws at an angle, with respect to the plane or movement of the bell crank 44. As shown the jaw 53 is straight and the jaw 52 is at an angle. Preferably these jaws 52 and 53 include removable or interchangeable hardened plates 52' and 53' on the face thereof. The spacing and angular arrangement of the jaws 52 and 53 are such that: pieces of product which are oversize in length will wedge between the jaws 52 and 53 substantially in the outer one third thereof; pieces of product of correct or standard size will wedge in the center one third of the jaws; and product undersize in length will wedge in the closer or rearmost one third of the jaws. A recess 55 is provided near the center of the gauge 42 to clear the stop 30.

The spring 51 and cam 49 are arranged to move the bell crank 44 and associated gauge 42 from the retracted position shown in Fig. 1 arcuately into the advanced position shown in Fig. 4. During this movement the jaws 52 and 53 of the gauge 42 envelope the lowermost piece of product 31 in the work holder 24, which is resting upon the stop 30. As the tapered jaws are arcuately moved in a counterclockwise direction as viewed in Fig. 1 past the stop 30, the piece of product is finally wedged between the jaws 52 and 53 (viz., overlength product in the one-third front or outer section of the jaws; standard product in the one-third central section of the jaws; and underlength product in the one-third final or inside section of the jaws), whereupon the gauge 42 and product 31 are moved into the advanced position shown in Fig. 4. At this point the operator may merely press down on the product which is wedged in the gauge 42 and thereby cause it to drop from the gauge into immediately underlying overlength, standard and underlength chutes 56, 57 and 58, respectively, of a chute unit 59.

Figure 3:
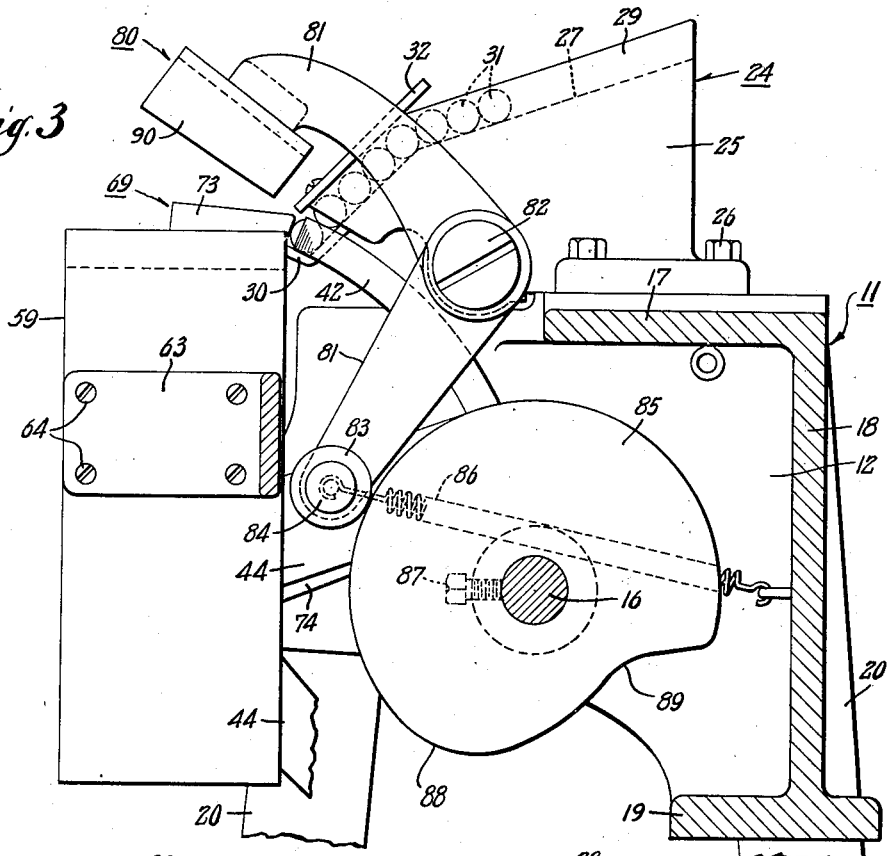
Fig. 3 is a fragmentary side view, partly in section, taken on line 3—3 of Fig. 2, showing the gauging member in the retracted positions and the presser member in the advanced position.

This chute unit 59 may be made in any suitable way. As shown it is formed by a sheet metal main casing 60 of generally rectangular form with dividing plates 61 and 62 which separate the main channel of this member into the three chutes. These chutes are preferably held in place by a bracket 63 which is secured to the chutes as by screws 64 and to the main frame 11 as by bolts 65 (Figs. 1, 2 and 3). The width of the overlength, standard and underlength chutes 56, 57 and 58, respectively, is each proportioned and located to underlie the overlength, standard and underlength sections of the gauge 42 when the latter is in the advanced position shown in Fig. 4.

These chutes may be made of any desired length vertically and the configurations thereof may change suitably as they extend downwardly in order to divert the assorted product into suitable containers. For example, the chute 56 may be provided with a downwardly and forwardly extending slide 66 of the dividing plate 61 in order to roll the overlength product into a container near the front of the machine; the chute 58 may be provided with a downwardly and rearwardly extending slide 67 to divert the underlength product to a suitable container near the rear of the machine; a sidewise and downwardly extending slide 68 may be welded or otherwise secured to the slides 66 and 67 to shut the standard or correct product to another container slightly from the chute 57 to the side of the machine. These diverting slides are merely diagrammatically shown in Fig. 1 as the completed construction depends somewhat on the type of conventional container used therewith, as will be readily appreciated by any mechanic.

Impelling mechanism

To further insure product being wedged between the jaws 52 and 53 of the gauge 42 as the latter is moved and carries product from the retracted to the advanced position, the present invention provides an impelling mechanism 69 which, in its present preferred form (Figs. 1, 2 and 4), includes an impeller bell crank 70 pivotally mounted upon a sleeve 71 supported on a hub 72 of the gauge-carrying bell crank 44 (see Fig. 2). The impeller bell crank 70 includes a plate 73 at the upper end thereof normally substantially in the path of the product and intermediate the jaws 52 and 53 as shown in Figs. 1 and 2, and also has an integral rearwardly extending arm 74 with the roller 75 adapted to engage an impeller cam 76 suitably secured to the main drive shaft 16 as shown in Figs. 1 and 4, particularly. A coil spring 77 having its ends secured to the upwardly extending part of the impeller bell crank 70 and to the upper arm or the gauge bell crank 44 serves to yieldingly pull the impeller bell crank 70 and the plate 73 thereon rearwardly in a clockwise direction as viewed in Fig. 1 and to maintain the plate 73 in this normally retracted position whenever the lower lobe 78 of the cam 76 is in engagement with the roller 75. This spring connection between the two bell cranks 44 and 70 also serves to provide a uniform pressure of the plate 73 against product 31 as the gauge 42 and the product 31 therein move toward the advanced position, since the pull of the spring 77 in effect moves along with the travel of the gauge 42.

As the jaws 52 and 53 of the gauge 42 sweep in a clockwise direction from the retracted position shown in Fig. 1 toward the advanced position shown in Fig. 4, the plate 73 is in the path of the lowermost piece of product 31 then resting upon the stop 30 and yieldingly impels or pushes the product into a snug wedge fit between the jaws 52 and 53. After the product is so wedged between the jaws the spring 77 allows the plate 73 and crank arm 70 to be carried in a counterclockwise direction concurrently with the product 31, gauge 42 and crank 44. As the gauge 42 approaches the advanced position shown in Fig. 4 a high lobe 79 on the cam 76 engages the roller 75 to move the bell crank 70 of the impelling mechanism 69 to its farthest counterclockwise position shown in Fig. 4, and entirely clear of the gauge 42 and clear of the product 31 carried thereby.

Ejecting mechanism

Although product may be manually pushed from the gauge 42 when the latter is in the advanced position overlying chutes 56, 57 and 58, as shown in Fig. 4, the present invention advantageously provides automatic ejecting means 80 including an ejector bell crank 81 pivotally mounted upon a stud 82 suitably secured to a side wall of the standard 25, as may be seen best in Figs. 2 and 3. This bell crank 81 is preferably provided with a roller 83 on a stud 84 at its lower end, which, in turn, is yieldingly maintained against an ejector cam 85 as by a coil spring 86 secured to suitable studs on the ejector bell crank 81 and main frame 11, as shown in Figs. 2 and 3. The cam 85 is suitably secured to the main drive shaft 16 as by a screw 87, and is provided with a high lobe 88 adapted to move the bell crank into the retracted and farthest clockwise position shown in Fig. 3, and with a low lobe 89 adapted to allow the bell crank 81 to be moved to its farthest counterclockwise position shown by dot-and-dash lines in Fig. 4 under the influence of the spring 86. An ejector head 90 is provided at the upper end of the bell crank 81, either integral therewith or in the form of a separate member secured thereto as by screws 91. As the head 90 is moved from the retracted position shown in solid lines in Fig. 4 downwardly into the advanced position shown by dot-and-dash lines in the same figure, the head serves to push underlying pieces of product then carried by the gauge 42 in the latter's advanced position as shown in Fig. 4 downwardly and out of the wedged position within the jaws 52 and 53 into the underlying chutes 56, 57 or 58. Preferably, this ejector head is inclined upwardly, generally toward the front of the machine, so that it has a tendency to loosen the wedged pieces of product at the time of also ejecting them downwardly from the gauge.

Driving mechanism

A main drive pulley 92 is suitably secured to the main drive shaft 16 as by a screw 93 and is, as through a belt 94, connected to any preferred form of prime mover. As shown, this prime mover may be in the form of an electric motor 95 secured to the bottom wall 19 of the main frame 11 as by bolts 96, and said motor in turn being connected to a driver pulley 97 through a standard reduction unit 98, as shown in Figs. 1 and 2. With the latter prime mover the belt extends from the driver pulley 97 to the driven pulley 92. The electric motor may be connected to any conventional source of power in the usual way.

Operation

Product 31 is placed in the channel 27 whereupon it rolls forwardly and downwardly to the stop 30. A suitable supply or flow of work is fed to the work holder 24 either manually or through a suitable connection of the work holder to a conventional hopper mechanism. When the main drive shaft 16 is rotated, as by the motor 95, in the manner just described or by any other suitable prime mover, a low lobe 49, of the cam 49 sweeps into engagement with the roller 47 of the gauge crank arm 44, and thereby allows the coil spring 51 to move the arm and gauge 42 from the retracted position shown in Fig. 1 into the advanced position shown in Fig. 4, whereupon the relatively tapered jaws 52 and 53 of the gauge 42 pick up the lowermost piece of product 31 then on the stop 30 of the work holder 24 and wedge the same between overlength, standard and underlength sections of the jaws 52 and 53 to carry such a piece of product into the advanced position as shown in Fig. 4.

Preferably the impelling mechanism 69 or the pushing plate 73 thereof is used, in which event the plate 73 is substantially adjacent the product 31 while the latter is in the lowermost position in the work holder 24 and yieldingly presses against the side of the same while the gauge 42 is moved toward the advanced position until the product is thoroughly yet gently wedged between and carried by the gauging jaws 52 and 53.

As the gauge arm 44 reaches the advanced position shown in Fig. 4, by reason of the continued rotation of the main drive shaft 16, the high lobe 79 of the impeller cam 76 moves the impeller crank arm 70 into the inoperative position shown in Fig. 4, and concurrently the low lobe 89 of the ejector cam 85 allows the ejector arm 81 to be moved in a counterclockwise direction by the spring 86, so that the head 90 thereon is moved from the raised inoperative position shown by solid lines in Fig. 4 into the lowermost position shown by dot-and-dash lines in the same figure, to eject work into underlying chutes 56, 57 or 58. The lobes on the various cams are proportioned to maintain the guage arm 44 in the advanced position and the impeller arm 70 in the inoperative position shown in Fig. 4 a sufficient length of time for the ejector arm 81 to be moved from the raised to the lowered position and then back again before the gauge arm 44 and impeller arm 70 are again moved into the loading position shown in Fig. 1.

The cycle of movements just described is repeated for each piece of work. However, since the entire machine has a simple positive gauging action upon the product it may be operated at a high rate of speed and results in a large production. It should be noted that the detent 33 is normally in the position shown in Fig. 4 after the gauge 42 initially moves toward the operative position even a slight extent and remains in this position all the time that the gauge completes its travel toward and into the advanced position, and until the gauge is again moved substantially into the retracted position shown in Fig. 1. As the gauge member approaches its farthest rearward or retracted position shown in Fig. 1 a pin 99 at the side thereof engages the finger 40 on the rod 36 and thereby kicks the detent from the stopping position shown in Fig. 4 into the clearing position shown in Fig. 1 in order to allow the next succeeding piece of work 31 to drop downwardly onto the stop 30.

It should be particularly noted that the retracting or non-work-performing travel of the gauging, impelling and ejecting components of the machine are mechanically and positively driven while the advancing or work-performing travel of these components is achieved by springs so that there will be no crushing of product, with possible dangerous results, if for any reason product should happen to jam therein.

Variations and modifications may be made within the scope of this invention and portions of the improvements may be used without others.

Having thus described the invention what is claimed as new is:

1. In a gauging apparatus, the combination of a main frame; gauging means mounted on said frame and oscillatable from a product receiving position to a final position; means to feed product to the gauging means; ejecting means oscillatably mounted on the frame to eject product from the gauging means when said gauging means is in its final position; and an oscillatable impelling means mounted on the frame and coordinately movable into operative position to press product into said gauging means and movable into an inoperative position during ejection of product from the gauging means.

2. In a gauging apparatus, the combination of a main frame; a main drive shaft on said frame with cam means mounted thereon; gauging means mounted on said frame and oscillatable from a product receiving position to a final position; yielding means to move said gauging means from the product receiving position to said final position, said gauging means being returnable positively by said cam means; means to feed product to the gauging means; oscillatable ejecting means mounted on the frame and movable by a yieldable means when the gauging means is at its final position to eject product therefrom, and returnable to an inoperative position positively by said cam means; and an impelling means oscillatable with the gauging means to yieldably press product into said gauging means and movable positively by said cam means to an inoperative position during ejection of product from the gauging means.

3. In a gauging apparatus, the combination of a main frame; gauging means mounted on said frame, and oscillatable from a product receiving position to a final position; means to feed product to the gauging means, said feed means including a product holder; a detent on said holder adapted to be operated by oscillation of the gauging means to allow movement of a piece of product into the path of said moving gauge; ejecting means oscillatably mounted on the frame to eject product from the gauging means when said gauging means is in its final position; and an oscillatable impelling means mounted on the frame and coordinately movable into operative position to press product into said gauging means, and movable into an inoperative position during ejection of product from the gauging means.

4. In a gauging apparatus, the combination of a main frame; a gauge; means for oscillating said gauge through a predetermined path to advanced and retracted positions; means to feed pieces of product into the path of said gauge, so as to be picked up by the gauge in its movement; an impeller in the path of said gauge for pressing the product into the gauge; chutes underlying said gauge when the latter is in the advanced position; means for removing the impeller from the product; and means for ejecting product from the gauge into one of said chutes in accordance with the position of the product in the gauge.

WARREN S. REYNOLDS.